(No Model.)
J. GOODNOUGH.
CULTIVATOR.
No. 333,514. Patented Jan. 5, 1886.
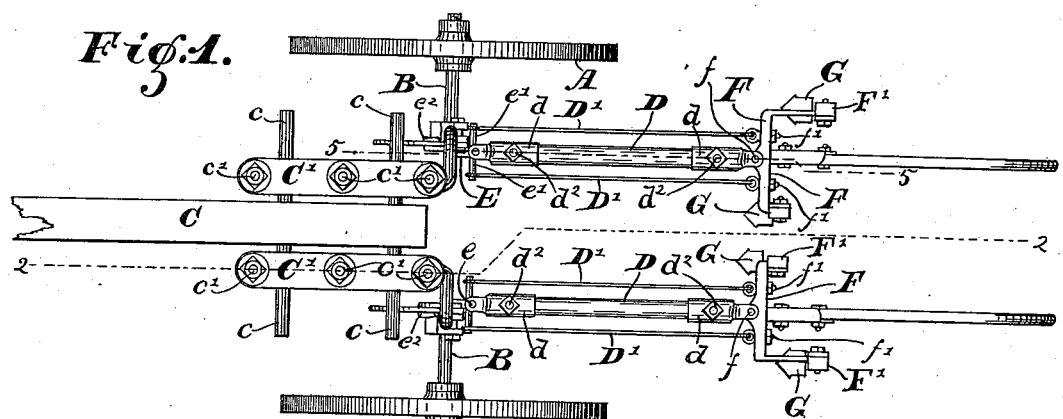
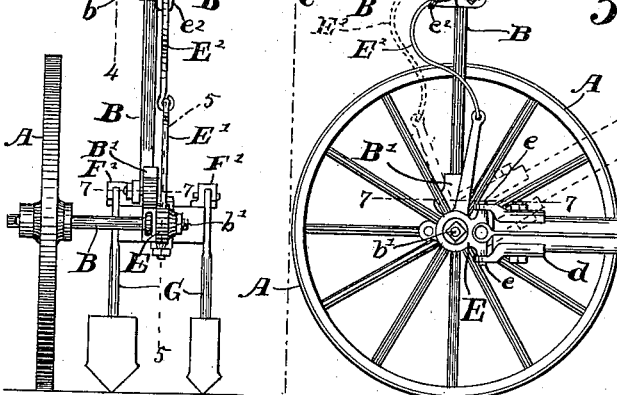
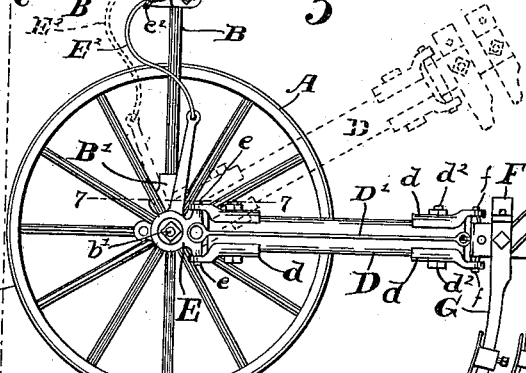
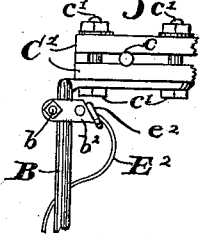
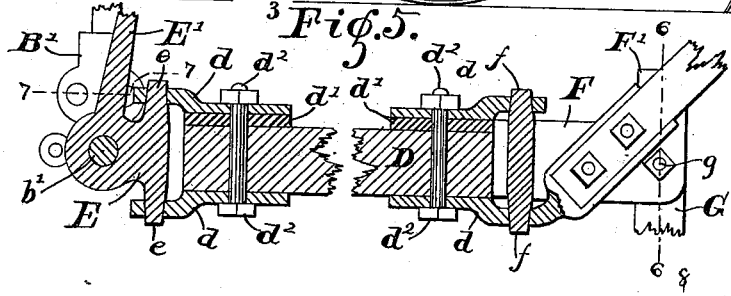
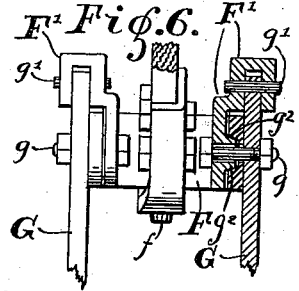
WITNESSES.
Chas N. Leonard.
E. W. Bradford.
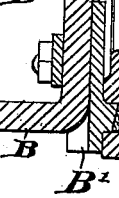
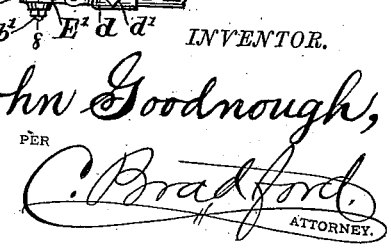
INVENTOR.
John Goodnough,
PER
C. Bradford,
ATTORNEY.
N. PETERS, Photo-Lithographer, Washington, D. C.

UNITED STATES PATENT OFFICE.

JOHN GOODNOUGH, OF INDIANAPOLIS, INDIANA.

CULTIVATOR.

SPECIFICATION forming part of Letters Patent No. 333,514, dated January 5, 1886.

Application filed March 21, 1885. Serial No. 159,621. (No model.)

*To all whom it may concern:*

Be it known that I, JOHN GOODNOUGH, of the city of Indianapolis, county of Marion, and State of Indiana, have invented certain new and useful Improvements in Cultivators, of which the following is a specification.

My said invention consists of certain improvements in the construction of cultivators, whereby they are more easily and accurately adjusted and held in position, as will be hereinafter more particularly described and claimed.

Referring to the accompanying drawings, which are made a part hereof, and on which similar letters of reference indicate similar parts, Figure 1 is a top or plan view of a cultivator embodying my invention; Fig. 2, a longitudinal vertical sectional view thereof, looking upwardly from the dotted line 2 2 in Fig. 1; Fig. 3, a view showing a portion of the cultivator in front elevation, as seen from the dotted line 3 3 in Fig. 2; Fig. 4, a detail view showing the supporting devices for the spring in elevation, as seen from the dotted line 4 4 in Fig. 3; Fig. 5, a longitudinal vertical section through one of the plow-beams on the dotted line 5 5 in Fig. 1; Fig. 6, a detail view, looking toward the left from the dotted line 6 6 in Fig. 5; Fig. 7, a horizontal sectional view, looking downwardly from the dotted line 7 7; and Fig. 8, a detail sectional view on the dotted line 8 8 in Figs. 2 and 7.

In said drawings, the portions marked A represent the wheels of the cultivator; B, the axle; C, the tongue; D, the plow-beams; E, the devices by which they are attached to the axles; F, the cross-heads, upon which the plows are secured, and G the plows.

The axles B carry the wheels A upon their outer ends in the usual manner, and extend into the point where the plow-beams are attached, then up to the height it is desired to carry the arch, then preferably in for a short distance, and then out in a direction parallel with the tongue, and are firmly secured to clamp-bars running alongside said tongue, as plainly shown in Figs. 1 and 2. They are squared just above the first bend, and have clamped thereon at this point castings B', carrying stud-shafts $b'$, upon which the device E is mounted, thus bringing the plow-beams within instead of outside of the arch. Said device, however, if desired, can be mounted upon the horizontal portion of the axle, instead of upon these stud-shafts; but I prefer the latter for the reason named.

The tongue C is in itself the ordinary straight tongue or pole. It has at its rear end two transverse bars or rods, $c$, which carry the clamp-bars C, to which the axle B is secured. These clamp-bars being divided in two parts, one on each side of said rods, and secured together by bolts $c'$, they can, by loosening said bolts, be adjusted to any position on said rods, and there secured by again tightening the bolts. The width of the arch is thus rendered variable. A part or all of the bolts $c'$ may be utilized for the double purpose of securing the axles B to the clamp-bars and in clamping said bars upon the transverse rods $c$, as shown most plainly in Figs. 2 and 4.

The beams D are provided at each end with extended bearing-plates $d$, which at the front end engage with pivots $e$, upon the devices E, and thus secure said beams thereto, and at the rear end with pivots $f$, upon cross-heads F, whereby said cross-heads are secured to said beams. The pivots in each case are tapered, and the upper bearing-plates have rubber or other compressible cushions $d'$ interposed between them and the beam, and thus as the bearings wear upon the pivots they can be tightened up by turning down the nuts upon the bolts $d^2$, which secure said bearing-plates upon said beam.

The devices E are mounted upon the stud-shafts $b'$, and are provided, as before stated, with pivots $e$, to which the plow-beams are secured. They have also projections $e'$ upon each side, forming cross-heads, for the purpose which will be presently described. Extending up from these devices, and formed integrally therewith, are arms E', and to the top of said arms are secured springs $E^2$, which extend around in front of the upright portions of the axle, and are secured to clamps on said upright portions. These arms and springs are so arranged that when the plow-beams are lifted, as indicated by dotted lines in Fig. 2, said plow-beams will be held in elevated position by the force of said springs, and the plows thus kept out of contact with the ground while the cultivator is being transported from place to place.

The clamps to which the upper ends of the springs $E^2$ are secured consist of blocks $b^2$, having inclined faces, and holders $e^2$ for said springs, the inner ends of which are slotted, and the outer ends of which are bent around under said springs, with one part resting upon the inclined face of the blocks $b^2$. (See Figs. 2, 3, and 4.) By loosening the bolt $b$, which holds the parts together, the holder $e^2$ can be moved up or down on the incline of the block $b^2$, and thus support the spring $E^2$ at any point, and prevent said spring from acting to force the plows into the ground, which it might otherwise do.

The cross-heads F are secured to the plow-beams by the pivots $f$ entering bearings in the bearing-plates $d$ on the plow-beams, as before indicated. They extend out equally on each side of said pivots, and have the plows G secured thereto. At the outer side, however, there is preferably a rearward extension on these cross-heads, so that the outside plows may be arranged somewhat in the rear of the inside ones.

In order to secure a parallel relation between these cross-heads F and the axles at all times, without reference to whether the plows are directly behind or to one side or the other of the point of attachment of the plow-beam, I have arranged small rods $D'$ upon each side of the plow-beams D, connecting the cross-heads F and the cross-heads formed by the said extensions of the devices E, and thus, no matter to what positions the plows are swung the cross-heads are always held in parallel relation with the axles. These rods are secured to the cross-heads at one or both ends by eye-bolts $f'$, and by adjusting the nuts on these eyebolts a proper tension for said rods is secured.

The plows G are secured to the cross-heads F by bolts $g$, which pass through the stems of said plows, the rearward extensions on the cross-heads, and vertical housings $F'$, at a point below the center of said extensions. Said housings extend up to a point above the cross-heads, where the plow-shanks are secured thereto by break-pins $g'$. By having the break-pins above instead of below the securing bolts the strain is thrown more onto said bolts and less onto said break-pins, which is desirable. The housings have tapering flanges, $g^2$, (see Fig. 6,) which enter corresponding cavities in the extensions on the cross-heads, and by this means, as the bolts $g$ are tightened up, the housings are held securely in place. They can be shifted so as to give the plows more or less inclination by simply loosening said bolts.

Having thus fully described my said invention, what I claim as new, and desire to secure by Letters Patent, is—

1. The combination, in a cultivator, of an axle consisting of two parts, each part consisting of a vertical and two horizontal portions, the upper portion being secured to clamp-bars, a tongue having transverse rods or bars, and said clamp-bars, said clamp-bars being secured upon said transverse rods alongside of said tongue, substantially as shown and described.

2. The combination, in a cultivator, of an arched axle formed of round iron and having vertical portions, said vertical portions being squared at a point just above the horizontal portions on which the wheels are mounted, clamps fitted to and secured upon said square portions of the axle, and having stud-shafts thereon to which the plow-beams are secured.

3. The combination, in a cultivator, of the axle, the plow-beams, intermediate attaching devices consisting in part of upwardly-projecting arms, springs secured to said arms, clamps on the vertical portions of the axle to which said springs are secured, said clamps consisting of inclined blocks and adjustable holders fitted over the inclines and adapted to be raised and lowered by being moved thereon, substantially as set forth.

4. The combination, with the springs $E^2$, and axle B, of clamps consisting of inclined blocks $b^2$, holders $e^2$, and bolts $b$, substantially as shown and described, and for the purposes specified.

5. The combination of the axle A, devices E, plow-beams D, cross-heads F, rods $D^2$, and eyebolts $f'$, substantially as set forth.

6. The combination of the plow-beams D, having bearing-plates $d$, with elastic cushions $d'$, and cross-heads F, pivoted to said bearing-plates by tapered pivots $f$, and said tapered pivots, substantially as described, and for the purposes specified.

7. The combination, in a cultivator, of the plow-beams, cross-heads thereon having rearward extensions, housings for the plow-shanks having inclined flanges $g^2$, and bolts passing through said extensions, plow-shanks, and housings, substantially as shown and described, and for the purposes specified.

8. The combination, in a cultivator, of the rearward extensions having tapered cavities therein, the housings $F'$, having tapered flanges $g^2$ thereon adapted to fit into said cavities, the plows, and the bolts $g$, whereby said several parts are secured together, substantially as set forth.

In witness whereof I have hereunto set my hand and seal at Indianapolis, Indiana, this 12th day of March, A. D. 1885.

JOHN GOODNOUGH. [L. S.]

In presence of—
C. BRADFORD,
E. W. BRADFORD.